(12) United States Patent
Surdu

(10) Patent No.: US 10,701,084 B2
(45) Date of Patent: *Jun. 30, 2020

(54) RELIABLE AND SECURE FIRMWARE UPDATE WITH A DYNAMIC VALIDATION FOR INTERNET OF THINGS (IOT) DEVICES

(71) Applicant: Oleksii Surdu, Broadlands, VA (US)

(72) Inventor: Oleksii Surdu, Broadlands, VA (US)

(73) Assignee: GBS Laboratories, LLC, Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/130,566

(22) Filed: Sep. 13, 2018

(65) Prior Publication Data

US 2019/0014128 A1    Jan. 10, 2019

Related U.S. Application Data

(63) Continuation of application No. 15/146,157, filed on May 4, 2016, now Pat. No. 10,097,563.

(51) Int. Cl.
*G06F 7/04* (2006.01)
*H04L 29/06* (2006.01)
(Continued)

(52) U.S. Cl.
CPC ............ *H04L 63/123* (2013.01); *G06F 8/654* (2018.02); *G06F 21/105* (2013.01);
(Continued)

(58) Field of Classification Search
CPC ........ G06F 8/65; G06F 21/105; G06F 21/602; G06F 8/71; G06F 11/1451; H04L 63/123
(Continued)

(56) References Cited

U.S. PATENT DOCUMENTS 8,201,161 B2   6/2012   Challener et al.
8,578,361 B2   11/2013  Cassapakis et al.
(Continued)

*Primary Examiner* — Mohammad W Reza
(74) *Attorney, Agent, or Firm* — Capitol City Techlaw; Jasbir Singh

(57) ABSTRACT

A computing system for a secure and reliable firmware update through a verification process, dynamic validation and continuous monitoring for error or failure and speedy correction of Internet of Things (IoT) device operability. The invention uses a Trusted Execution Environment (TEE) for hardware-based isolation of the firmware update, validation and continuous monitoring services. The isolation is performed by hardware System on a Chip (SoC) Security Extensions such as ARM TrustZone or similar technologies on other hardware platforms. The invention therefore comprises Firmware Update Service (FUS), System Validation Service (SMS) and Continuous Monitoring Service (CMS) running in the TEE with dedicated memory and storage, thus providing a trusted configuration management functionality for the operating system (OS) code and applications on IoT devices.
Services running in the TEE use both direct (hardware level) and indirect (software agents inside main execution environment (MEE)) methods of control of the MEE. Embodiments of the invention apply all updates to a staging (new) execution environment (SEE) without changing of the MEE.

7 Claims, 10 Drawing Sheets

Device Firmware – Execution Environments Model

(51) Int. Cl.
   *G06F 21/10* (2013.01)
   *G06F 21/60* (2013.01)
   *G06F 21/57* (2013.01)
   *G06F 8/654* (2018.01)
   *H04L 29/08* (2006.01)
   *G06F 11/14* (2006.01)

(52) U.S. Cl.
   CPC .......... *G06F 21/572* (2013.01); *G06F 21/602* (2013.01); *H04L 67/34* (2013.01); *G06F 11/1451* (2013.01); *G06F 11/1469* (2013.01); *G06F 2201/805* (2013.01); *G06F 2221/0797* (2013.01)

(58) Field of Classification Search
   USPC .......................................................... 726/30
   See application file for complete search history.

(56) References Cited

U.S. PATENT DOCUMENTS

| | | |
|---|---|---|
| 9,218,178 B2 | 12/2015 | Young et al. |
| 9,235,403 B2 | 1/2016 | Flynn |
| 9,792,143 B1 | 10/2017 | Jotlapally et al. |
| 2002/0188763 A1* | 12/2002 | Griffin .................... G06F 21/53 719/310 |
| 2006/0026422 A1 | 2/2006 | Bade et al. |
| 2012/0260244 A1 | 10/2012 | Keller et al. |
| 2014/0004825 A1* | 1/2014 | Prakash ................ H04W 12/06 455/411 |
| 2016/0246977 A1 | 8/2016 | Raskin et al. |
| 2016/0378976 A1* | 12/2016 | Kotary .................... G06F 21/53 713/193 |

\* cited by examiner

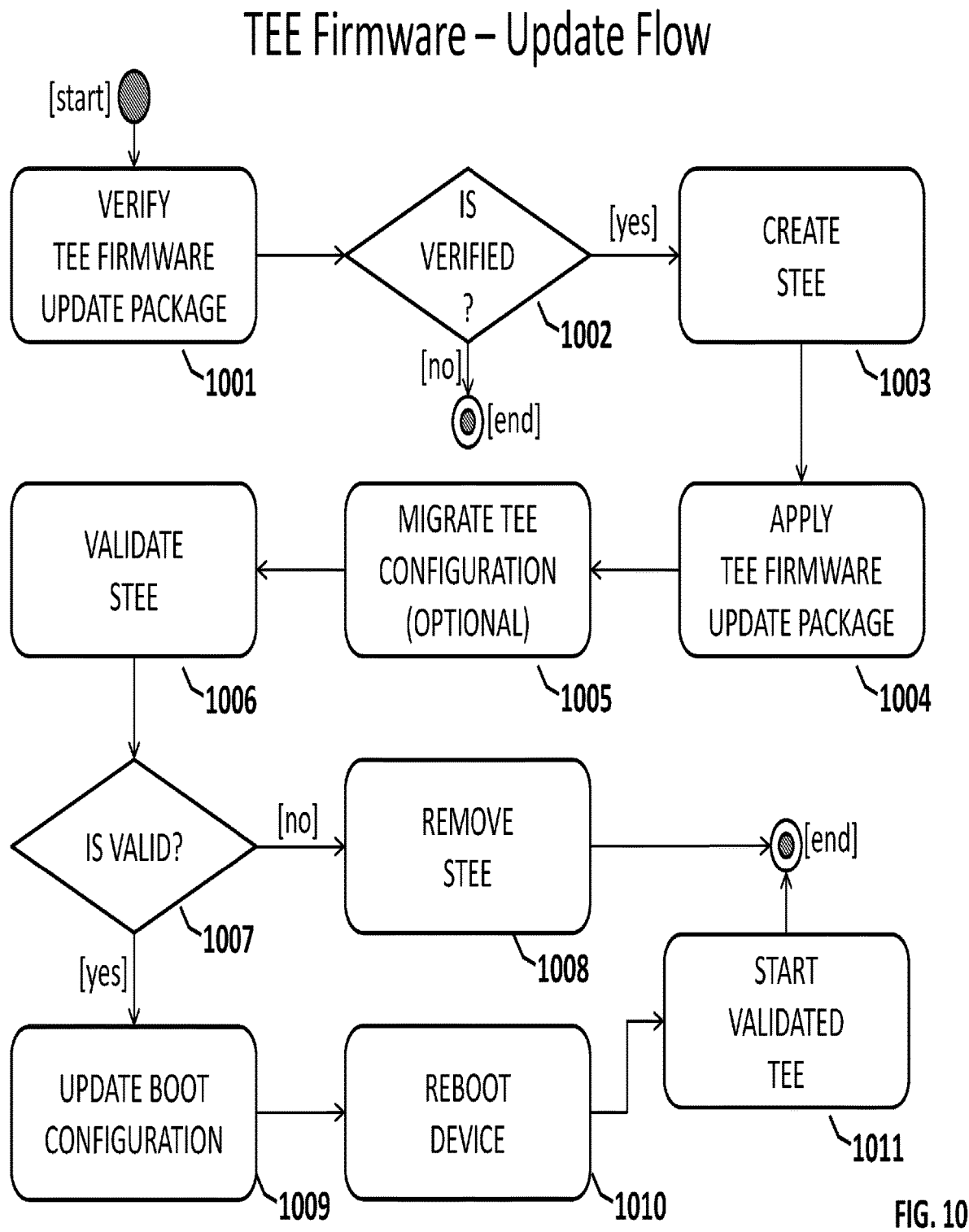

RELIABLE AND SECURE FIRMWARE UPDATE WITH A DYNAMIC VALIDATION FOR INTERNET OF THINGS (IOT) DEVICES

CROSS REFERENCE TO OTHER APPLICATIONS

The present application claims priority from U.S. patent application Ser. No. 15/146,157, filed May 4, 2016.

BACKGROUND OF THE INVENTION

With the growing number of deployed IoT devices, the importance of secure firmware updating is significantly increased. Gartner, Inc. forecasts that 6.4 billion connected things will be in use worldwide in 2016, up 30 percent from 2015, and will reach 20.8 billion by 2020. In 2016, 5.5 million new things will get connected every day.

All these devices need a reliable firmware update system. The functions of many IoT devices, expected to be operational typically at all times, requires a minimal downtime for service tasks, including firmware update. A typical IoT device is also expected to be operational for a long time and may warrant or require many updates over its life. A consumer of an IoT solution needs to be able to receive and have firmware updates implemented for IoT devices to fix security vulnerabilities and firmware errors or add new features. Another important factor is time, especially in case of firmware update error or failure for any reason. The ability to apply a security patch to a large number of devices as fast as possible is critical to prevent and/or reduce damage from error or breach, especially from zero day attacks unlikely to be thwarted by existing security.

The firmware update method and process should be simple and should provide an easy way to roll back to the previous version if for any reason the update is ineffective.

The present invention provides a solution using a reliable firmware update method and system where all updates are controlled from the TEE and applied to the clone of the current execution environment with the extensive tests at the end. As soon as the SEE is ready and validated, it starts operating normally with continuous monitoring. The MEE becomes backup execution environment (BEE), remains unchanged and can be restored very quickly if any problems with the firmware update are discovered.

Thus embodiments of the present invention address these requirements, including allowing return to the previous version of the firmware at any time. Furthermore, to increase the overall security level of a device, a minimal allowed firmware version may be set by the security policy, delivered either by a management system or firmware update package preventing the system from rollback to a firmware with known vulnerabilities.

In November 2015, ARM announced launch of the ARMv8-M architecture with ARM TrustZone technology. It provides developers with a reasonably fast and efficient way of protecting embedded software running on Internet of Things (IoT) devices. The present invention fully utilizes capabilities of the SoC Security Extensions in an innovative way to implement a reliable and secure firmware update for Internet of Things (IoT) devices.

Limitations of the traditional firmware update approaches, compared to the present invention, will become apparent to one having ordinary skill in the art through comparison of such approaches with the present invention.

RELATED ART

The following references identify related art:

[1] Surdu et al., "Reliable and Secure Firmware Update for Internet of Things (IoT) Devices", application Ser. No. 15/067,405, Mar. 11, 2016. [1] describes a method and system for a secure and reliable firmware update and management of Internet of Things (IoT) devices with parallel execution and usage of device emulation for stage execution environment. The main execution environment in [1] is active during the firmware update of the stage execution environment. This approach significantly reduces downtime of a device but requires more hardware resources for execution.

The present invention uses a different method and system for the firmware update compared to [1]. The main execution environment is inactive during the firmware update and no device emulation is used. Primary steps of the firmware update process are performed during the boot phase of a device which is different compared to [1] where these steps are executed without rebooting of the device or stoppage of the main execution environment.

The present invention is better suited for devices with limited hardware capabilities while [1] provides additional benefits to more powerful devices.

[2] Young et al., "Secure Firmware Updates", U.S. Pat. No. 9,218,178 B2, Dec. 22, 2015. [2] describes a secure firmware update system based on a pre-boot environment. The present invention uses SoC Security Extensions of the hardware platform to provide TEE environment for firmware update process and is better suited for IoT devices.

[3] Insyde Software Corp, "System And Method For Updating Firmware", U.S. Pat. No. 9,235,403 B2, Jan. 12, 2016. [3] describes a firmware update mechanism which uses ROM image to store firmware update code. While this approach provides a reliable protection for the updater code, it prevents future updates of the updater itself. The present invention does not have this limitation.

[4] Keller et al., "Failsafe Firmware Updates", U.S. Patent Application US 2012/0260244 A1, Oct. 11, 2012. [4] describes a failsafe method of updating an electronic device using 3 separate non-volatile memory partitions. The present invention supports multiple dynamic copies of the execution environment and ability to switch between copies at any time with optional configuration synchronization.

[5] Challener et al., "System And Method To Update Device Driver Or Firmware Using A Hypervisor Environment Without System Shutdown", U.S. Pat. No. 8,201,161 B2, Jun. 12, 2012. [5] describes a system, method and program for a firmware/driver update of a device using a hypervisor environment without system shutdown. The present invention uses firmware update code running in the TEE to update the whole IoT device OS and not only device drivers or firmware.

[6] Cassapakis et al., "Updating An Electronic Device With Update Agent Code", U.S. Pat. No. 8,578,361 B2, Nov. 5, 2013. [6] describes a method of updating an electronic device with update agent code. The present invention runs firmware update code in TEE and applies all changes to the cloned execution environment without modification of the original execution environment. The process of this invention does not modify current execution environment and performs post update validation before switching to the new execution environment.

BRIEF DESCRIPTION OF THE DRAWINGS

FIG. 10 depicts the TEE firmware update flow.

DETAILED DESCRIPTION

Preferred embodiments of the present invention require a hardware-enforced Trusted Execution Environment (TEE). The present invention provides an innovative approach of using SoC Security Extensions to isolate and the protect firmware update system for an IoT device.

Preferred embodiments of the present invention do not put any restrictions on methods of delivery of the firmware updates to a device and can be used with a number of different approaches, including user-provided updates or updates automatically downloaded from the Internet or other networks.

As will be apparent to one having ordinary skill in the art, the present invention is focused on providing a secure and reliable firmware lifecycle management for an IoT device, including firmware update package verification, firmware update with post-update validation, continuous monitoring (health check) and recovery.

Figure 1:
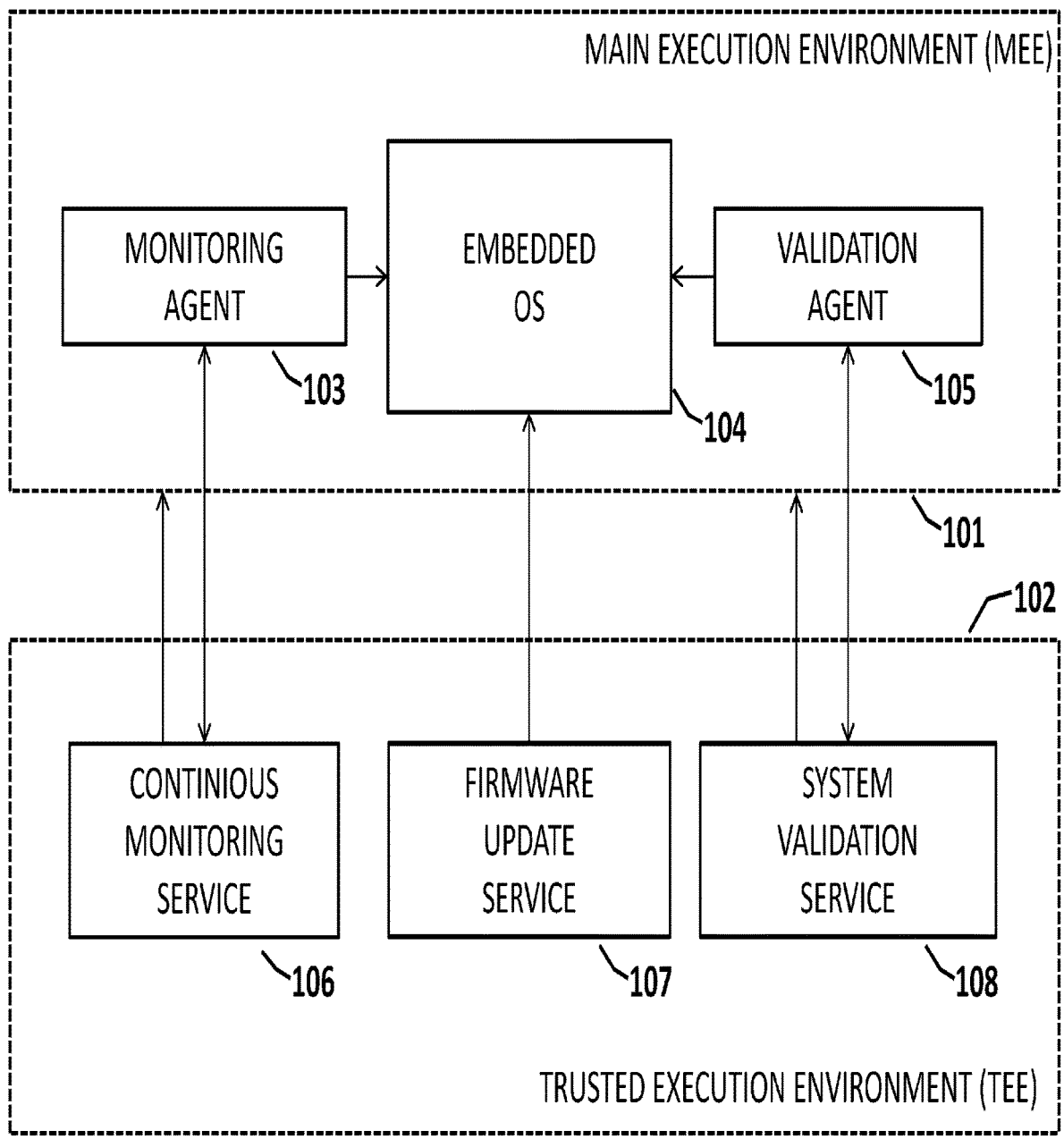
FIG. 1 illustrates an IoT Execution Environments Model in which one or more embodiments of reliable and secure firmware update with a dynamic validation for IoT Devices can be employed.

FIG. 1 illustrates a device execution environment model. All critical code and data of the firmware update, validation and the monitoring system are protected by the TEE.

The embedded OS (104) and two agents—a Monitoring Agent (103) and a Validation Agent (105)—are both running in the MEE (101). Critical parts of the system are protected by the TEE (102).

The firmware update process is controlled by the FUS (107). The MEE is not modified during the update, as all changes are applied to the newly created SEE. Verification of the firmware update package is performed inside the TEE, which is running in parallel with the MEE. As is apparent to one having ordinary skill in the art, a microkernel architecture can be used to implement parallel execution of TEE and MEE.

A System Validation Service (SVS) (108) is responsible for the post-update validation of the SEE. Such an SVS supports two method of the validation:
  External—using a direct access to the MEE and hardware;
  Internal—using the Validation Agent running inside MEE.

A Continuous Monitoring Service (CMS) (106) performs health monitoring of the MEE. Such a CMS supports two method of the monitoring:
  External—using a direct access to the MEE and hardware;
  Internal—using the Monitoring Agent running inside MEE.

The main difference between a SVS and a CMS is that the SVS is used only once for each new firmware update to ensure that the firmware update process was completed successfully and the SEE is ready to work. CMS, in contrast, is always active during the normal work of the MEE.

In case of detected failures, the CMS may try to apply an auto fix for known problems or initiate rollback to the BEE. Optionally, if no BEE exists, the initial factory firmware version may be restored.

Figure 2:
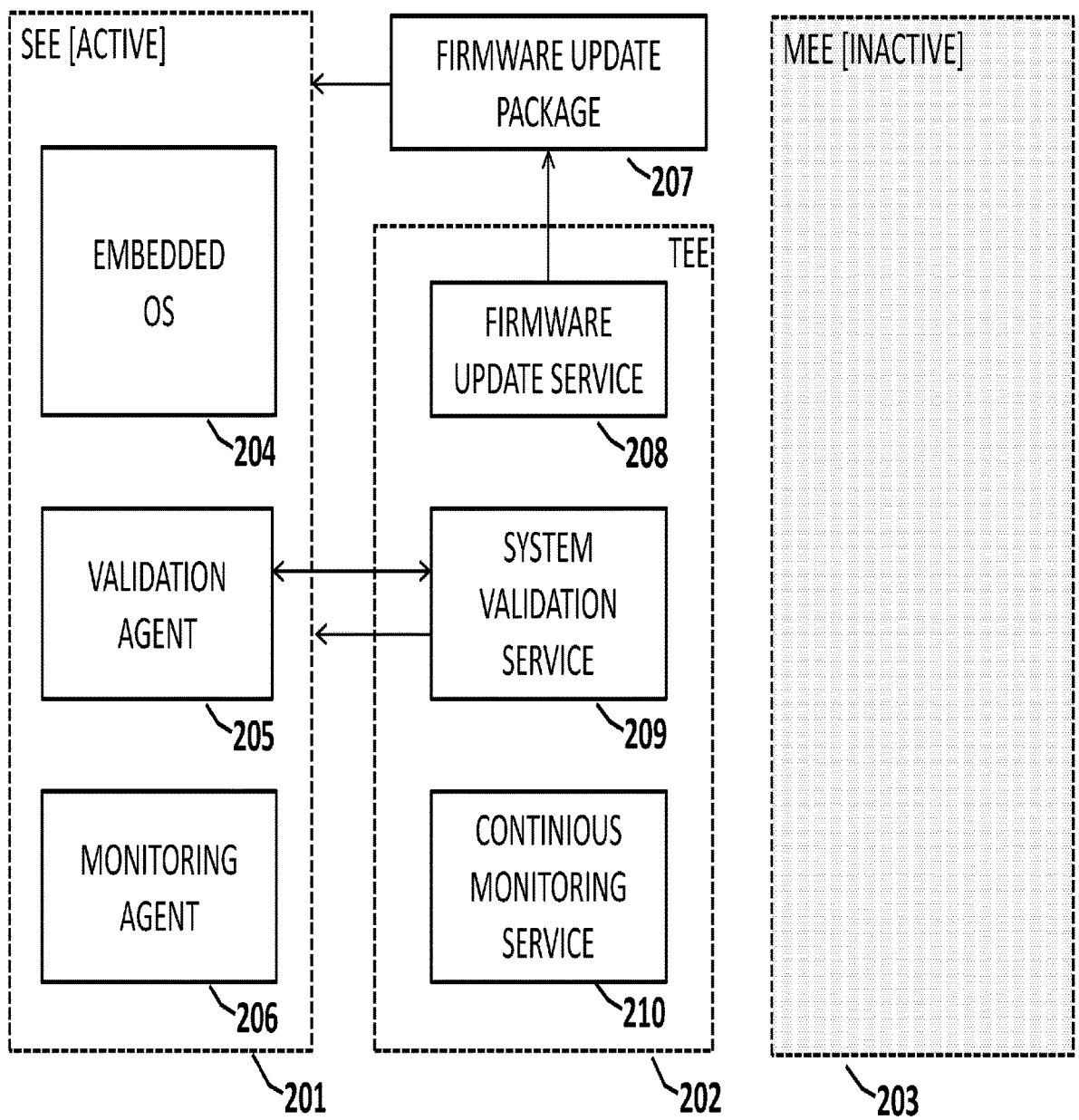
FIG. 2 illustrates the execution environment model during the firmware update process.

FIG. 2 illustrates an execution environments model during the firmware update process.

FUS (208) running in the TEE (202) is responsible for Firmware Update Package (FUP) (207) verification and installation. FUS also creates the SEE (201) on a permanent storage and copies the MEE (203) into it. All execution environments (EEs) are isolated at the hardware level from each other. A malfunctioning or compromised MEE is therefore unable to damage other EEs or the TEE. The isolation is performed by the Security Extensions of the hardware platform.

The system is optimized for devices with limited hardware resources and applies the FUP after stoppage of the MEE and rebooting of the device. As is apparent to one having ordinary skill in the art, in certain scenarios it may be desirable to apply the FUP to the SEE and perform-post update validation before rebooting the device, in order to minimize downtime.

FUP verification is performed using cryptographic algorithms inside TEE. All cryptographic keys and certificates are stored inside the TEE and are inaccessible from the MEE. Optionally, the keys can be stored in the MEE in an encrypted form.

Figure 3:
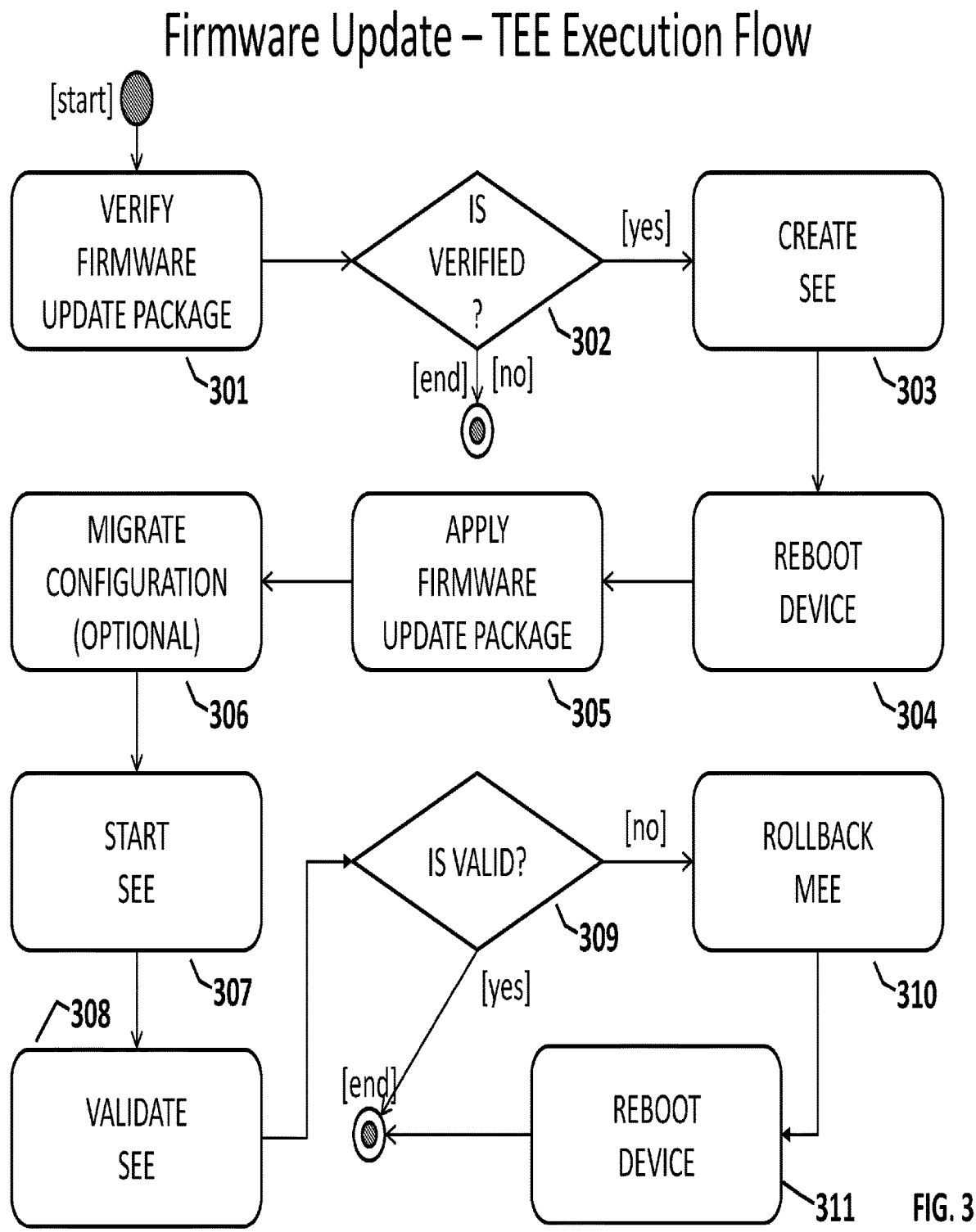
FIG. 3 illustrates TEE Execution Flow of the firmware update process.

FIG. 3 illustrates TEE execution flow of the firmware update process. The flow of the process is controlled by a software running in the TEE. The MEE is not modified during the process, as all changes are performed in the newly created SEE. The system performs extensive validation of the SEE after the completion of the firmware update process. If the validation fails for any reason, the system automatically starts the MEE and removes the SEE.

The process has multiple steps, including the FUP verification, creation of the new SEE, and application of the FUP with optional migration of the configuration.

As is apparent to one having ordinary skill in the art, the primary method of FUP delivery for an IoT device is an automatic detection and download of the new FUP from the cloud. Optionally, a local network service or removable media can be used to deliver the FUP to a device.

The process starts with the FUP verification (301). If the result (302) of the verification is successful, the FUS creates the SEE (303), copies the MEE into it, and reboots the device (304). Optionally, steps 304 and 305 can be switched (304<->305) to minimize downtime of the device. Otherwise, the firmware update is cancelled and the MEE starts operating normally.

The MEE remains unchanged and can be used later as a backup copy for recovery.

During the boot phase of the device, if the pending firmware update process is found FUS applies FUP (305) and performs optional migration (306) of the configuration from MEE.

Upon successful completion of the previous step the system starts SEE (307) and initiate SEE validation (308). If the result (309) of the validation is "failed," the FUS removes SEE, starts MEE (310) and reboots the device (311).

If the validation is successful, the CMS activates, BEE is removed, the MEE becomes the BEE, and the SEE becomes the new MEE and starts operating normally.

As is apparent to one having ordinary skill in the art, the system can store any required number of copies of execution environments (limited only by the available hardware resources).

Figure 4:
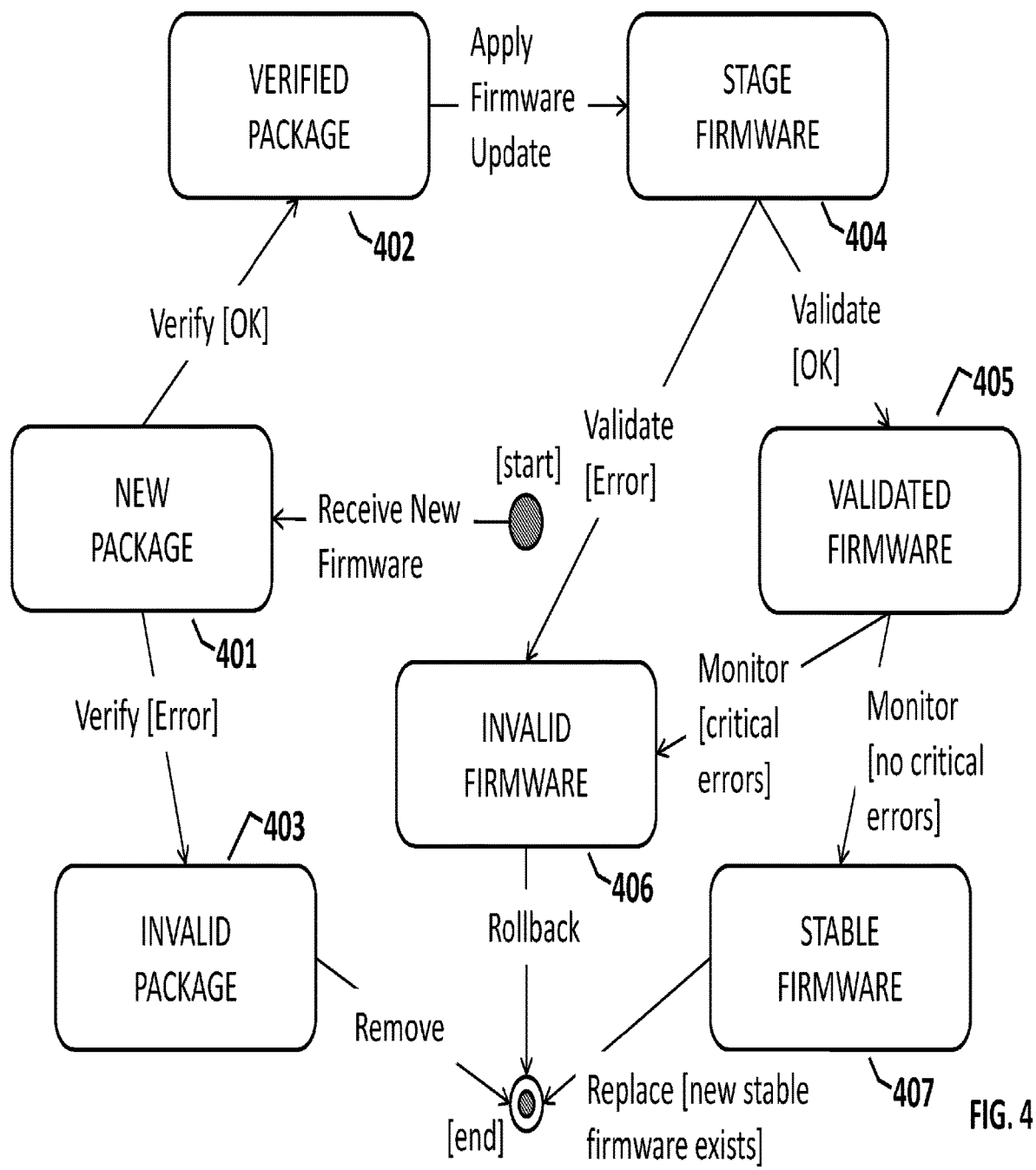
FIG. 4 depicts the life cycle of a device's firmware.

FIG. 4 describes the life cycle of a device's firmware. As is apparent to one having ordinary skill in the art, the present invention focuses on the security and reliability levels of the firmware update process for an IoT device. The firmware should successfully pass multiple checks and run without critical errors for a configured period of time before the system starts to determine and conclude it is meets stability requirements.

To assure stability, a new FUP receives initial "New Package" (401) status after delivery to the device and following the verification procedure, the FUP will switch into either "Verified Package" (402) if the validation is successful, or "Invalid Package" (403) otherwise. If the FUP is determined to be an "Invalid Package", the firmware update process stops.

Next, the FUS applies the FUP to the SEE, the firmware receives "Stage Firmware" (404) status, and validation starts. After successful validation, the firmware receives "Validated Firmware" (405) status. At this point, the firmware update process is considered completed and the device starts operating normally.

If the validation is unsuccessful, the firmware receives "Invalid Firmware" (406) status and the rollback procedure starts, deleting the SEE and starting the MEE.

The system performs also continuous monitoring of the MEE. If the CMS detects critical errors in the MEE and no auto fix is known to the system, the firmware receives "Invalid Firmware" status and rollback procedure starts.

If no critical errors are detected in the MEE during the configured period of time, the firmware receives "Stable Firmware" (407) status and is copied to as the new BEE, replacing the existing one. The minimal recommended waiting period for is several days at least. Later, if monitoring discloses critical errors in the MEE, the firmware will be restored from the BEE. During the recovery process, a new MEE will be created based on the BEE. The BEE remains unchanged during the recovery and can remain so as many times as its required.

Optionally, the process described in the above paragraph can be repeated at configured intervals. Configuration parameters of this process is stored in TEE.

The life cycle of the "Stable Firmware" ends when a new version of the stable firmware becomes available.

Figure 5:
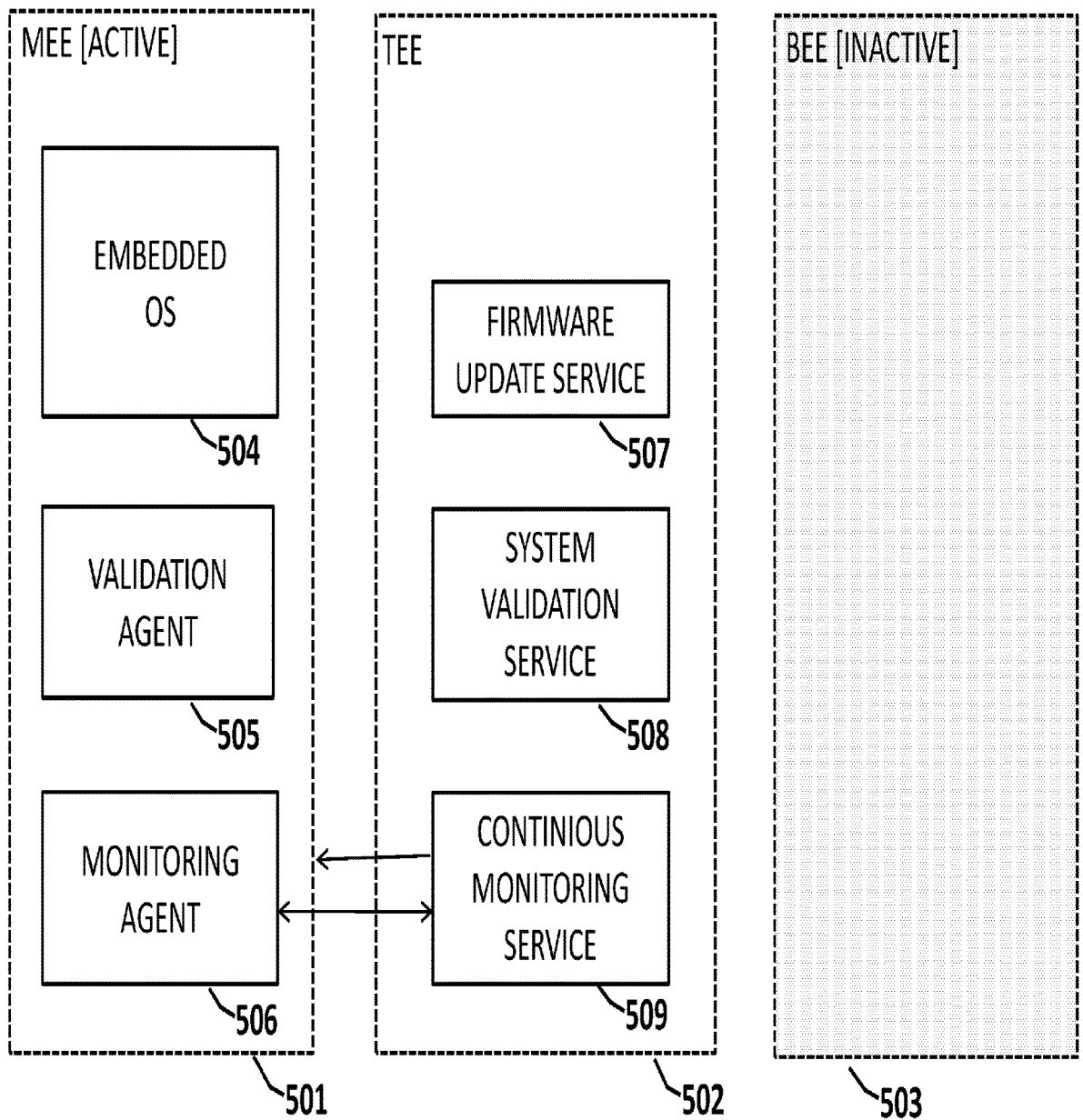
FIG. 5 illustrates the structure of continuous monitoring of the MEE.

FIG. 5 illustrates the structure of continuous monitoring of the MEE. The CMS running in the TEE uses direct access to the hardware and a Monitoring Agent (which runs in the MEE) to monitor the current state of the MEE.

The CMS (509) running in the TEE (502) is responsible for non-stop health monitoring of the MEE (501), either directly or using the Monitoring Agent (506) running inside the MEE.

The FUS (507), SVS (508) and Validation Agent (505) are not used during the normal operation of the device outside of the firmware update process.

The BEE (503) stays in an inactive state for recovery purposes.

Figure 6:
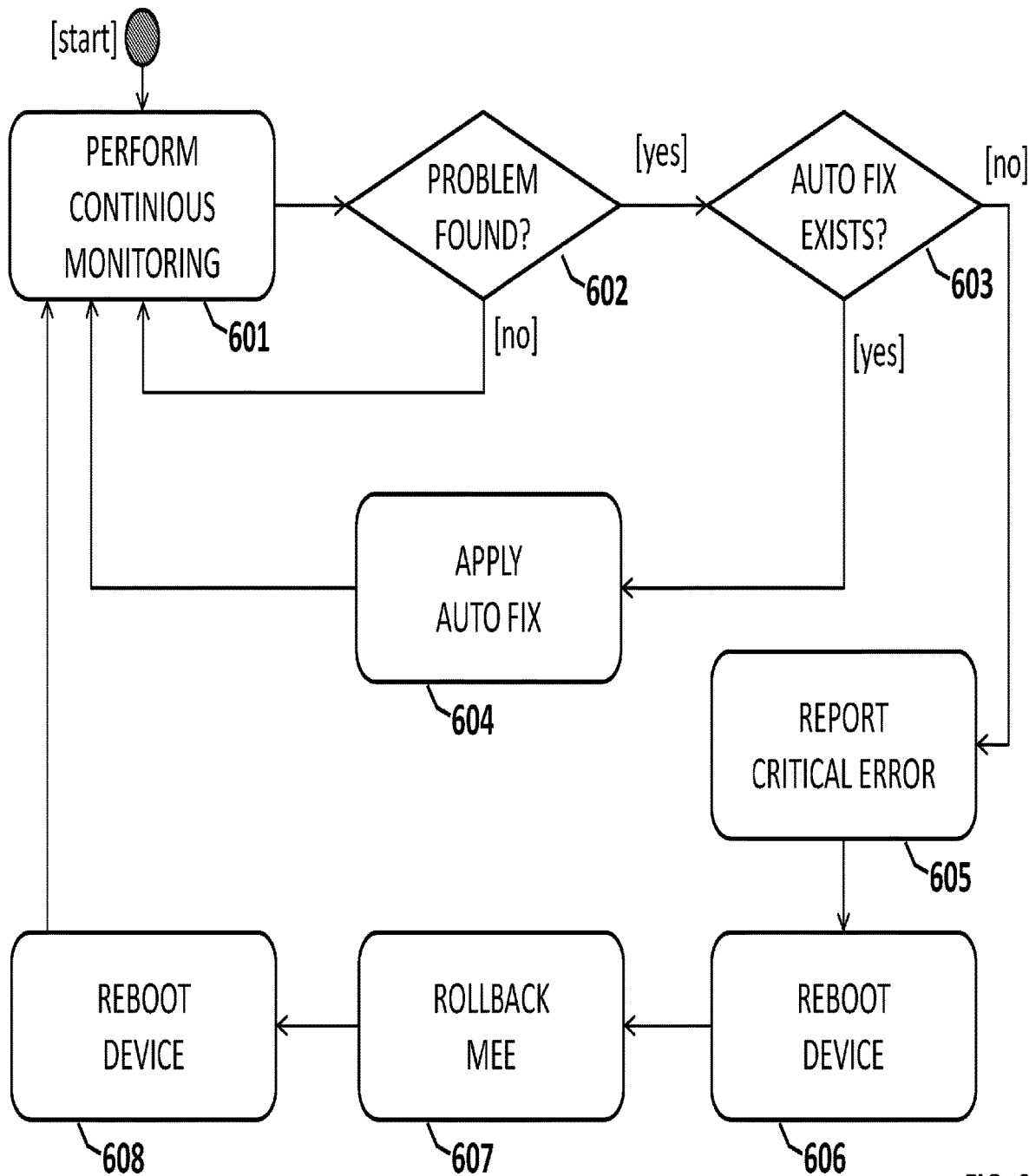
FIG. 6 depicts the flow of the continuous monitoring process.

FIG. 6 describes the flow of the CMS. The system supports automatic fixes of the known errors and can be configured to send notifications based on the MEE state changes. In case of critical errors, the system can restore the MEE from the BEE copy.

The CMS performs non-stop health monitoring of MEE (601) except for the duration of the firmware update or recovery process. If the monitoring detects any error (602) and an auto fix is possible (603) (for example, to reset the network adapter or to renew the DHCP lease), then the CMS applies the fix (604) and returns to monitoring.

If there is no auto fix for the detected error, then the CMS reports a critical error (for example, a damaged partition on the permanent storage, critical errors in drivers, etc.) (605), reboots the device (606), and initiates the rollback procedure for the MEE (607). After these steps, the CMS reboots the device (608) and returns to normal operation.

Optionally, the CMS can create backup copies of the configuration of the MEE at configured intervals. The copies are stored in the MEE configurations database.

Figure 7:
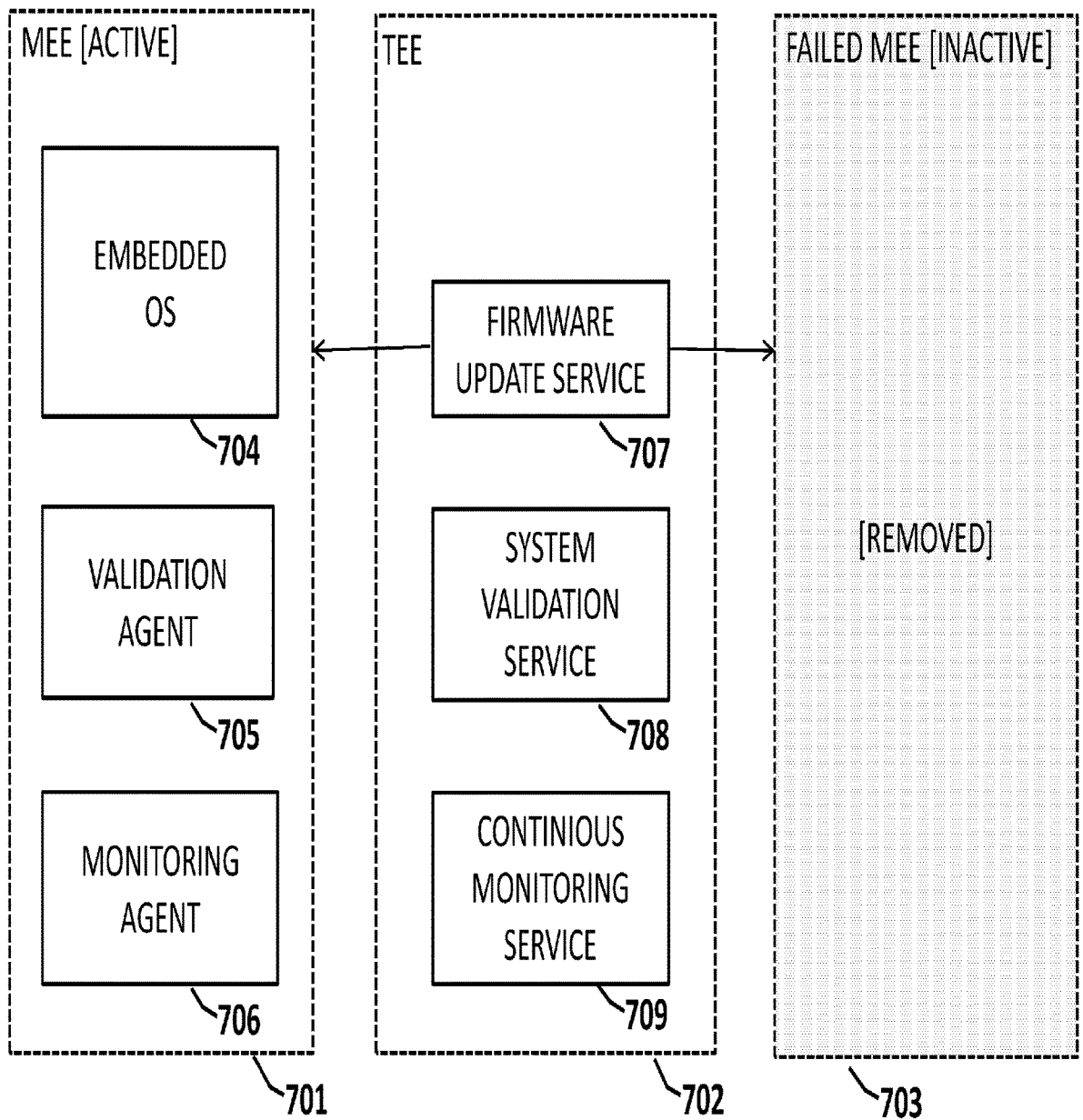
FIG. 7 illustrates the structure of the recovery process.

FIG. 7 illustrates the structure of the recovery process. During the process, the failed MEE is removed and the MEE is recovered. Device reboot is required to start the recovery process (see FIG. 8).

The FUS (707) running in the TEE is responsible for the recovery process. SVS (708), CMS (709) and two agents—Validation Agent (705) and Monitoring Agent (706)—are inactive active during the recovery process.

The FUS is also responsible for the removal of the failed MEE (703) and creation of the MEE (701) based on the BEE.

Figure 8:
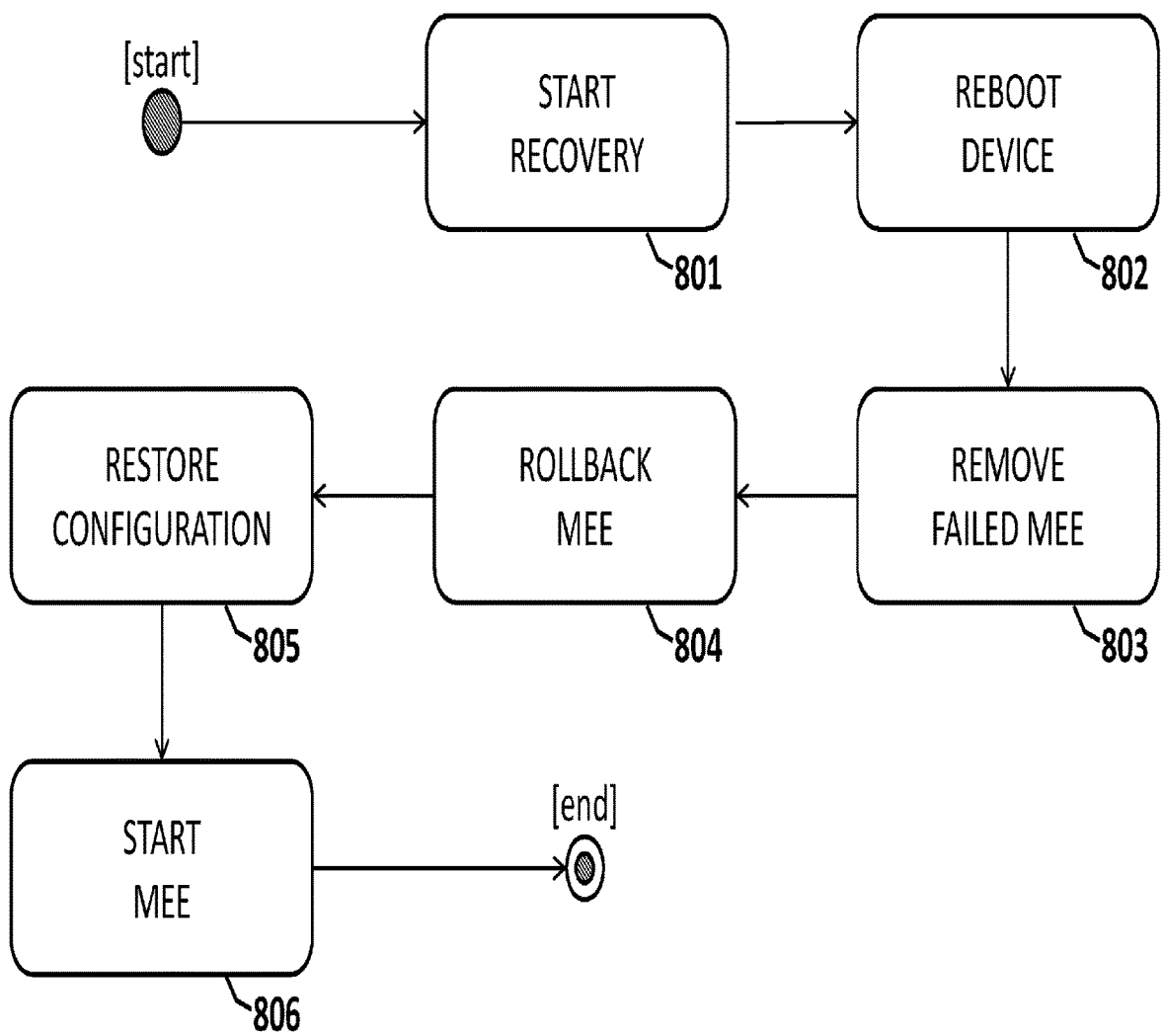
FIG. 8 depicts the recovery process flow.

FIG. 8 depicts the recovery process flow. Before the start of recovery, the device is rebooted. The system recreates the MEE from the BEE, restores the last known effective configuration for the corresponding firmware version from the MEE configurations database, and removes the failed MEE.

Recovery (801) can be initiated by FUS (on failed validation), CMS (on critical error found with no known auto fix) or by a user. Device reboot (802) is required for recovery. After reboot, the FUS removes the failed MEE (803) and rolls back the MEE (804) to the last known effective state.

On successful completion of the previous step, the FUS restores the configuration (805) from the MEE configurations database and starts new MEE (806).

After the completion of the recovery process, the device operates normally with activated continuous monitoring service.

Figure 9:
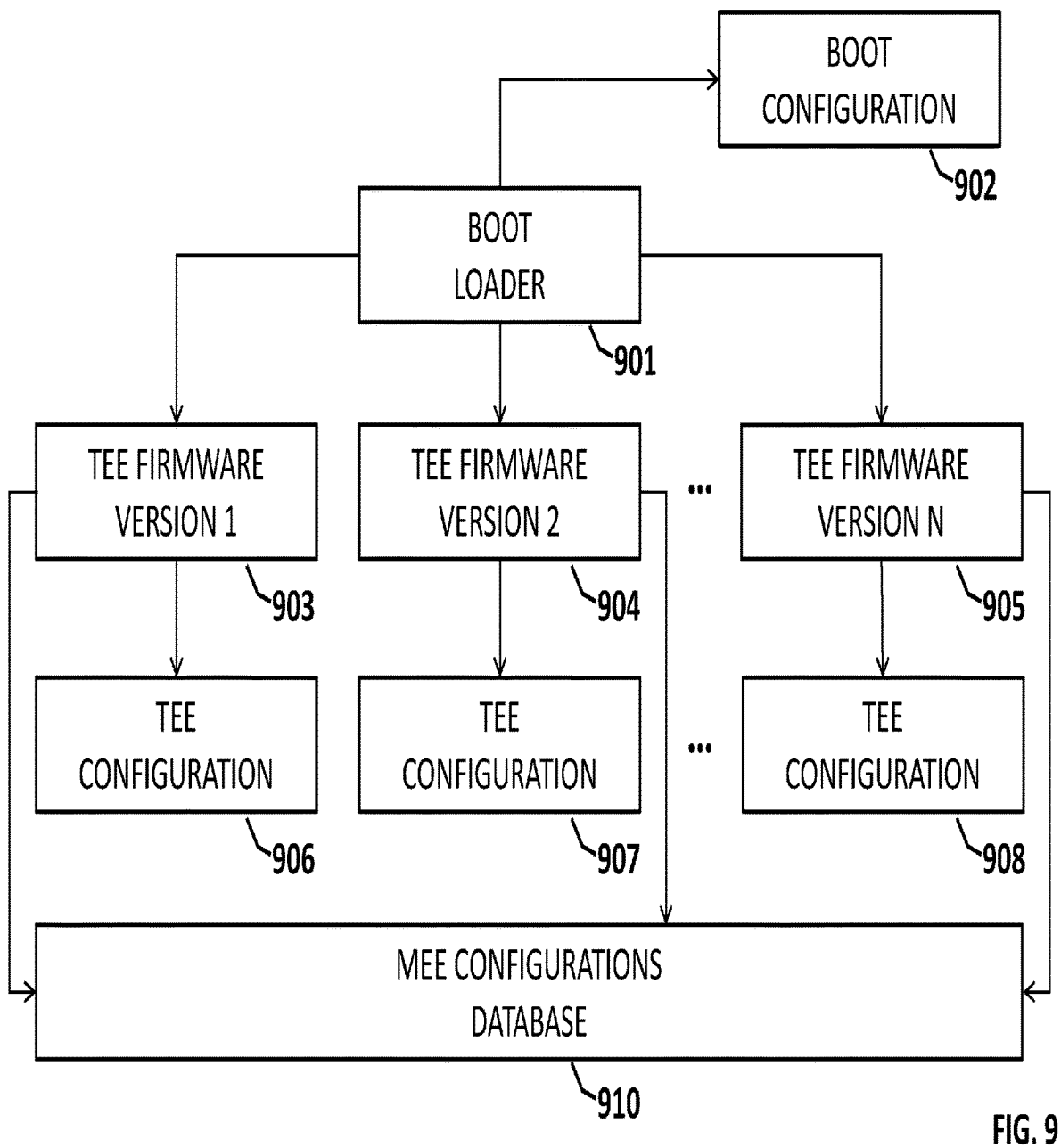
FIG. 9 illustrates the structure of the TEE firmware.

FIG. 9 illustrates the structure of the TEE firmware. The Boot Loader (901) uses Boot Configuration (902) to determine which TEE Firmware (903-905) to load. Each TEE Firmware has its own TEE Configuration (906). The factory default state contains two identical TEE Firmware copies for reliability purposes.

Embodiments of the invention use a separate data partition controlled by the TEE to store backup copies of the MEE configurations in the MEE configurations database (910). Each backup copy includes a compatible firmware version, timestamp and configuration data.

The TEE FUP may contain an update to the Boot Configuration, for example, a minimal TEE Firmware Version may be set during the update.

The Boot Loader is also responsible for the selection of the correct TEE Firmware to load. Normally, the latest firmware is selected but this behavior may be changed by the Boot Configuration. If it detects failures in TEE Firmware, it starts the start next TEE Firmware. As is apparent to one having ordinary skill in the art, different methods can be utilized to detect failures in TEE Firmware including, but not limited to, TEE self-tests, a historical record of the initiated TEE Firmware loading without a corresponding record of the successful completion of this process, etc.

FIG. 10 describes the TEE firmware update flow. The flow of the process is controlled by a software running in the TEE. The current version of the TEE is not modified during the process and all changes are performed in the newly created Stage TEE (STEE). The system performs extensive validation of the STEE after the completion of the TEE firmware update process. If the validation fails, the system automatically removes the STEE and continues normal operations.

The process steps include TEE firmware update package verification, creation of the new STEE, and application of the TEE FUP with optional migration of the previous version's configuration.

The process starts with TEE FUP verification (1001). If the result (1002) of the verification is successful, the FUS creates STEE (1003) and copies the current TEE into it. Otherwise the firmware update is cancelled and the TEE continues to operate normally.

The current TEE remains unchanged and can be used later as a backup copy for recovery.

In the next step, the FUS applies the TEE FUP (1004) and performs optional migration (1005) of the configuration from the current TEE.

On successful completion of the previous step, the system validates the STEE (1006). If the result (1007) of the validation is "failed", the FUS removes STEE and continues to operate normally.

If the validation is successful, the successful FUS updates the Boot Configuration (1009) and reboots the device (1010). After this stage, the TEE becomes a Validated TEE and starts operating normally.

As is apparent to one having ordinary skill in the art, the system can store a preconfigured number of backup copies of the TEE Firmware and automatically remove old copies above the configured threshold.

I claim:

1. A system to securely perform a firmware update on a computing system, the system comprising:
   a computer system firmware update package comprising a new firmware for a Trusted Execution Environment (TEE),
   a security extension to isolate the TEE; and
   a firmware update system to run in the TEE,
   wherein the TEE continues to operate normally while the firmware update system performs integrity, authenticity validation and management of the computer system firmware update package,
   creates a Stage Trusted Execution Environment (STEE) to replace the TEE, copies the TEE into the STEE, applies the new firmware to the STEE, and
   updates a boot configuration to start the STEE as the TEE, wherein the firmware update system validates the STEE after applying the new firmware and prior to updating the boot configuration to start the STEE as the TEE.

2. The system as claimed in claim 1 further comprising a Bootloader that validates the TEE each time when the computing system starts and loads the TEE after successful validation.

3. The system as claimed in claim 1 further comprising a Bootloader that detects a failed or damaged TEE and removes the TEE.

4. The system as claimed in claim 1 wherein the system comprises limited hardware resources.

5. The system as claimed in claim 1 wherein the firmware update system migrates a configuration of the TEE to the STEE.

6. The system as claimed in claim 1 wherein the TEE functions as a backup to the STEE.

7. The system as claimed in claim 1 further comprising restarting the device to boot the new TEE.

\* \* \* \* \*